*(12)* United States Patent
Park et al.

(10) Patent No.: US 7,844,011 B2
(45) Date of Patent: Nov. 30, 2010

(54) APPARATUS AND METHOD FOR IMPROVING SYMBOL ERROR RATE PERFORMANCE OF M-ARY PHASE SHIFT KEYING SYSTEM HAVING QUADRATURE ERROR

(75) Inventors: Seung Keun Park, Daejeon (KR); Jin A Park, Daejeon (KR); Pyung Dong Cho, Daejeon (KR); Hyeong Ho Lee, Daejeon (KR)

(73) Assignee: Electronics and Telecommunications Research Institute, Dae jeon (KR)

( * ) Notice: Subject to any disclaimer, the term of this patent is extended or adjusted under 35 U.S.C. 154(b) by 1034 days.

(21) Appl. No.: 11/592,080

(22) Filed: Nov. 2, 2006

(65) Prior Publication Data

US 2007/0110189 A1  May 17, 2007

(30) Foreign Application Priority Data

Nov. 11, 2005  (KR) .................... 10-2005-0108074

(51) Int. Cl.
*H04L 27/18* (2006.01)

(52) U.S. Cl. .................. 375/279; 375/280; 375/281; 375/282; 375/283; 375/284; 375/316; 375/329; 375/330; 375/331; 375/332; 375/333; 375/340; 375/346; 375/348; 370/215

(58) Field of Classification Search ......... 375/279–284, 375/329–333, 316, 340, 346, 348; 370/215
See application file for complete search history.

(56) References Cited

U.S. PATENT DOCUMENTS 6,075,408 A * 6/2000 Kullstam et al. ............ 329/304
6,334,203 B1 * 12/2001 Inagawa .................... 714/798
6,426,949 B1 * 7/2002 Zhou et al. .................. 370/342
6,717,993 B1 * 4/2004 Shiraishi et al. ............. 375/329
7,109,787 B2 * 9/2006 Meyer ........................ 329/304
2002/0064233 A1 * 5/2002 Terreault et al. ............ 375/261
2004/0109516 A1 * 6/2004 O'Shea ....................... 375/340

FOREIGN PATENT DOCUMENTS

JP    2004-140697    5/2004

OTHER PUBLICATIONS

Notice of Allowance dated Nov. 29, 2007 issued from the Korean Patent Office.

(Continued)

*Primary Examiner*—Mohammad H Ghayour
*Assistant Examiner*—Sophia Vlahos
(74) *Attorney, Agent, or Firm*—Ladas & Parry LLP (57) ABSTRACT

An apparatus and method for improving a symbol error rate of an M-ary phase shift keying (M-PSK) system having a quadrature error are provided. The apparatus includes: a conversion parameter detector that detects a conversion parameter and converts a symbol decision region using the quadrature error and at least one pair of first received symbols; and a converter & determiner converting a pair of second received symbols using the detected conversion parameter, and determining a transmission symbol according to a symbol of the converted pair of second received symbols. An increase in a symbol error rate due to the quadrature error can be prevented and the quadrature error can be easily estimated.

6 Claims, 6 Drawing Sheets

OTHER PUBLICATIONS

Park, S., "SEP Performance of Coherent MPSK Over Fading Channels in the Presence of Phase/Quadrature Error and I-Q Mismatch." Jul. 2005. *IEEE Transactions on Communications*, vol. 53, No. 7., pp. 1088-1091.

Park, J., "Performance Analysis of Symbol Error Probability for MPSK with an I-Q Unbalance over a Rician Fading Channel." Apr. 2005. *IEICE Trans. Commun.*, vol. E88-B, No. 4, pp. 1702-1704.

Park, S., "An Alternative Expression for the Symbol-Error Probability of MPSK in the presence of I/Q Unbalance." Dec. 2004. *IEEE Transactions on Communications*, vol. 52, No. 12, pp. 2079-2081.

Simon, M., "Some New Twists to Problems Involving the Gaussian Probability Integral." Feb. 1998. *IEEE Transactions on Communications*, vol. 46, No. 2, pp. 200-210.

* cited by examiner

FIG. 6

APPARATUS AND METHOD FOR IMPROVING SYMBOL ERROR RATE PERFORMANCE OF M-ARY PHASE SHIFT KEYING SYSTEM HAVING QUADRATURE ERROR

BACKGROUND OF THE INVENTION

This application claims the benefit of Korean Patent Application No. 10-2005-0108074, filed on Nov. 11, 2005, respectively, in the Korean Intellectual Property Office, the disclosure of which are incorporated herein in their entirety by reference.

1. Field of the Invention

The present invention relates to an M-ary phase shift keying (M-PSK) system, and more particularly, to an apparatus and method for estimating a quadrature error caused by demodulating a M-PSK signal and improving a symbol error rate caused by the quadrature error.

2. Description of the Related Art

M-ary phase shift keying (M-PSK) systems are classified into quadrature phase shift keying (QPSK) systems, 8-PSK systems, 16-PSK systems, etc. according to modulation level values M. Most wireless communication systems use QPSK, whereas a recently published enhanced data for global evolution (EDGE) standard adopts 8-PSK to increase transmission speed.

Research into the performance of modulation methods of higher M values in high speed wireless communication has been conducted. M-PSK systems have quadrature errors due to the imperfect performance of 90-degree phase shifters. A quadrature error indicates a phase shift between I channel signals and Q channel signals of receivers over 90 degrees. As the quadrature error increases, the symbol error rate performance of the M-PSK systems deteriorates.

SUMMARY OF THE INVENTION

The present invention provides an apparatus and method for improving a symbol error rate of a M-ary phase shift keying (M-PSK) system having a quadrature error.

According to an aspect of the present invention, there is provided an apparatus for improving a symbol error rate of an M-ary phase shift keying (M-PSK) system having a quadrature error, the apparatus comprising: a conversion parameter detector that detects a conversion parameter and converts a symbol decision region using the quadrature error and at least one pair of first received symbols; and a converter & determiner converting a pair of second received symbols using the detected conversion parameter, and determining a transmission symbol according to a symbol of the converted pair of second received symbols.

According to another aspect of the present invention, there is provided a method of improving a symbol error rate of a M-PSK system having a quadrature error, the apparatus comprising: detecting a conversion parameter to convert a symbol decision region using the quadrature error and at least one pair of first received symbols; converting a pair of second received symbols using the detected conversion parameter; and determining a transmission symbol according to a symbol of the converted pair of second received symbols.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
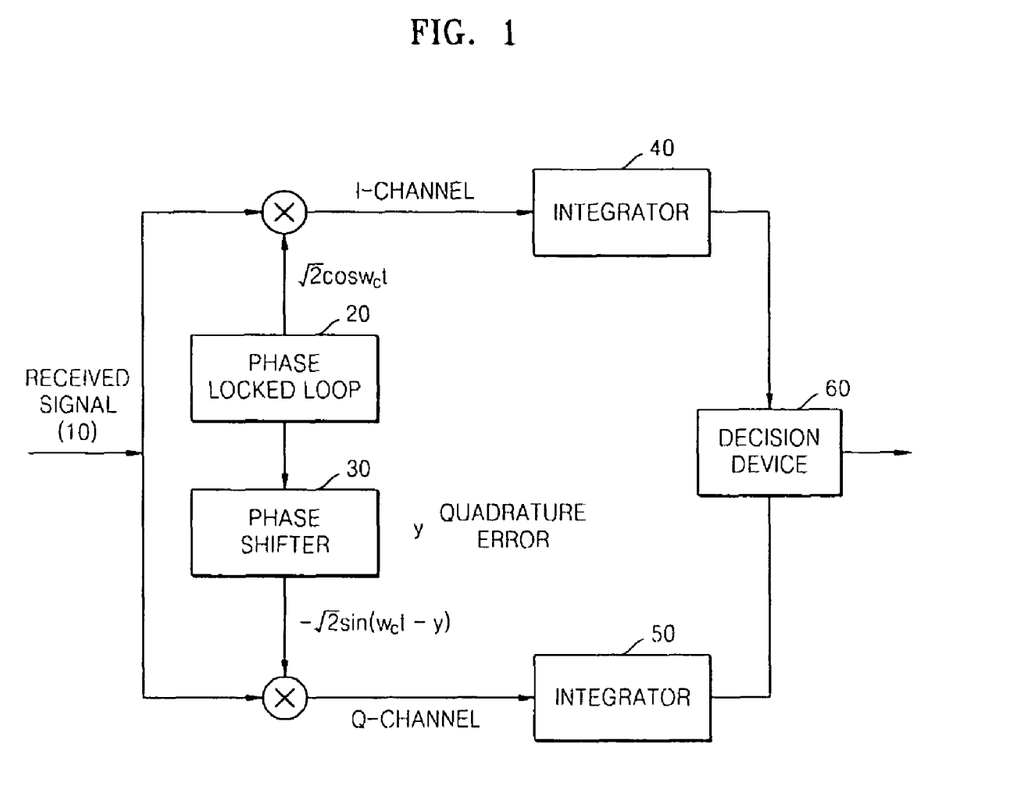
FIG. 1 is a block diagram of a receiver of an M-ary phase shift keying (M-PSK) system.

FIG. 1 is a block diagram of a receiver of an M-ary phase shift keying (M-PSK) system. Referring to FIG. 1, in an I-channel of the receiver, a signal $\sqrt{2} \cos w_c t$ generated by a phase locked loop (PLL) 20 is multiplied by a received signal 10. A signal obtained through the multiplication is integrated by an integrator 40 and is input to a decision device 60.

In a Q-channel of the receiver, the signal $\sqrt{2} \cos w_c t$ output by the PLL 20 is phase shifted 90 degrees by a 90-degree phase shifter 30. When the 90-degree phase shifted signal has a quadrature error y, a signal $-\sqrt{2} \sin(w_c t - y)$ is output from the 90-degree phase shifter 30. The signal $-\sqrt{2} \sin(w_c t - y)$ is multiplied by the received signal 10, and is input to the decision device 60 through an integrator 50.

The decision device 60 compares the two integrated values transmitted through the I-channel and the Q-channel with a symbol error region, i.e., a symbol decision region, and determines a received symbol according to a result obtained through the comparison.

Figure 2A:
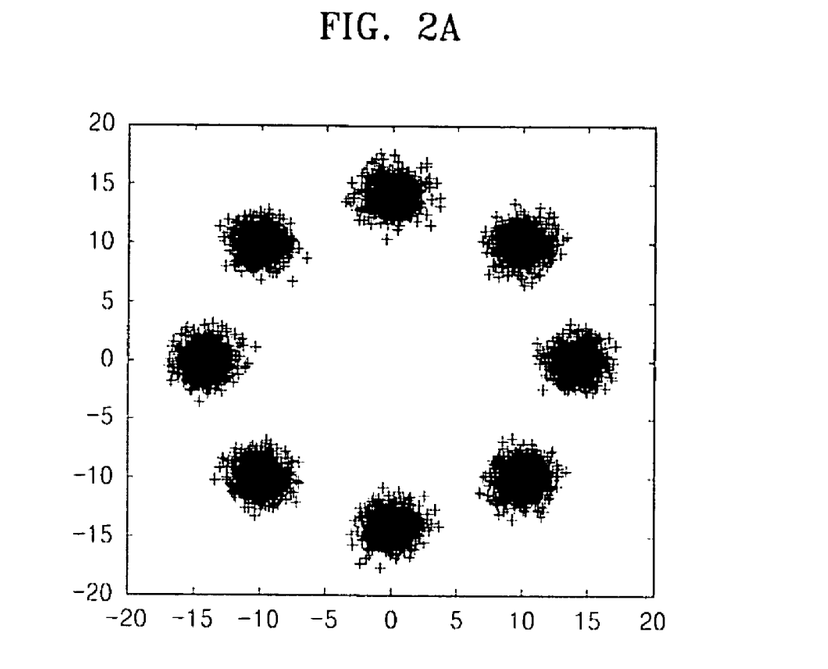
FIGS. 2A and 2B illustrate I-Q constellations of demodulation signals of 8-PSK systems with and without a quadrature error, respectively.
Figure 2B:
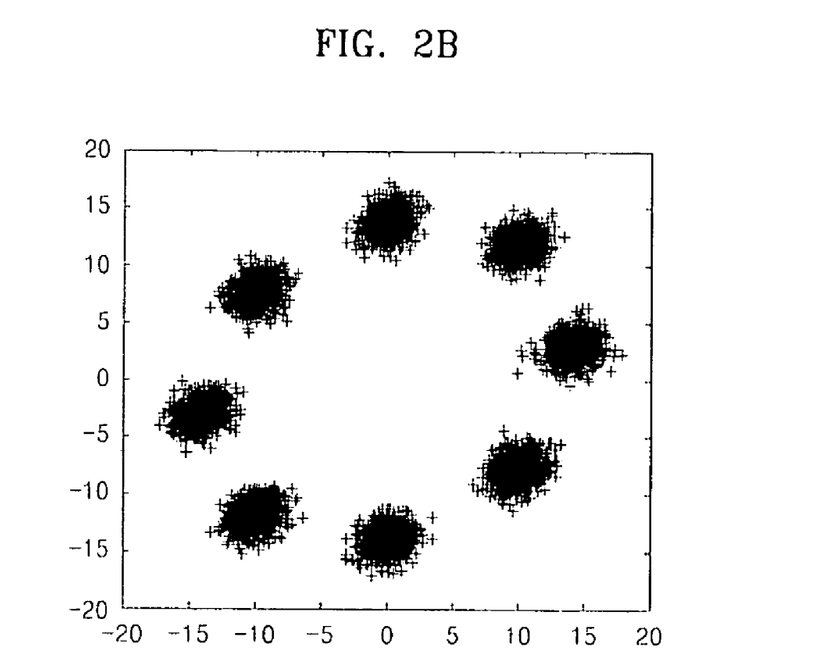

FIGS. 2A and 2B illustrate I-Q constellations of demodulation signals of 8-PSK systems with and without a quadrature error, respectively. Referring to FIG. 2A, when an 8-PSK system has no quadrature error, received 8-PSK symbols are equally distributed at eight points which form a large circle. Also, the received 8-PSK symbols have independent two-dimensional Gaussian distributions.

Referring to FIG. 2B, unlike the I-Q constellations illustrated in FIG. 2A, received 8-PSK symbols form a circle at eight points displaced due to the quadrature error. The received 8-PSK symbols have correlated two-dimensional Gaussian distributions.

The present invention relates to a method of reducing a symbol error rate of an M-PSK system having a quadrature error by providing a new decision region used to determine transmitted symbols using phase information of sample symbol values used to determine demodulation symbols. The sample symbol values are, for example, the signals input to the decision device 60 illustrated in FIG. 1, but the present invention is not limited thereto. Also, the sample symbol values are two signals provided via I and Q channels, respectively, i.e., a pair of symbols.

More specifically, a conversion parameter necessary for determining a second received symbol is detected using an estimated quadrature error and a first received symbol. The second received symbol is converted according to the detected conversion parameter. It is determined what is a transmission symbol to the second received symbol using a new decision region. A third received symbol is used to estimate the quadrature error for detecting the conversion parameter. The first, second, and third received symbols are the sample symbol values. The sample symbol values, i.e., the signals input to the decision device 60, may or may not be redundant to the first, second, and third received symbols. The signals input to the decision device 60 and the first, second, and third received symbols can have a variety of relationships. However, in the detailed description, the third received signal for estimating the quadrature error is used as an initial sample for the signals input to the decision device 60, the first received symbol for detecting the conversion parameter is used as a subsequent sample of the signals input to the decision device 60, and other samples are used to determine a substantial transmission symbol.

Figure 3:
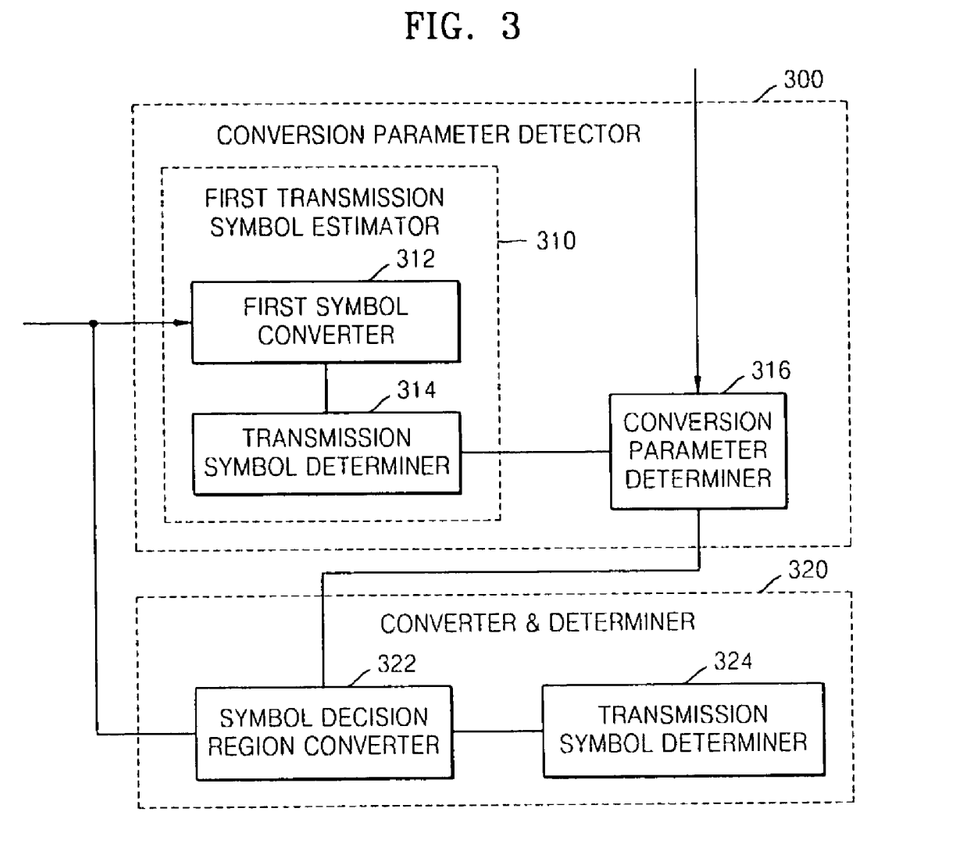
FIG. 3 is a block diagram of an apparatus for improving symbol error rate performance of an M-PSK system having a quadrature error according to an embodiment of the present invention.

FIG. 3 is a block diagram of an apparatus for improving symbol error rate performance of an M-PSK system having a quadrature error according to an embodiment of the present invention. Referring to FIG. 3, the apparatus comprises a conversion parameter detector 300, and a converter & determiner 320.

The conversion parameter detector 300 detects a parameter for converting a symbol decision region using the quadrature error y and at least one pair of first received symbols. In detail, the parameter is detected using an average of a pair of symbols estimated as a received symbol of a predetermined transmission symbol among the at least one pair of first received symbols. The quadrature error uses an estimated value by measuring a phase difference between the signals input and output by the 90-degree phase shifter 30 illustrated in FIG. 1. A method of estimating the quadrature error according to another embodiment of the present invention will be described later.

The conversion parameter detector 300 comprises a first transmission symbol estimator 310 and a conversion parameter determiner 316. The predetermined transmission symbol has an in-phase component, i.e., a signal having a phase value 0 transmitted from a transmission end. The first transmission symbol estimator 310 extracts a pair of received symbols suspected of having information regarding the phase value 0 from the at least one pair of first received symbols, and detects the received signal at a first right point among the eight points as illustrated in FIG. 2B.

The first transmission symbol estimator 310 estimates the pair of received symbols of the transmission symbol having the in-phase component only among the at least one pair of first received symbols. An example of a method of estimating the pair of received symbols as the transmission symbol having the in-phase component only transmits N1 transmission symbol having the in-phase component as a training signal in the transmission end, and determines the N1 transmission symbol having the in-phase component only as the pair of received symbols as the transmission symbol. A method of estimating the pair of received symbols as the transmission symbol having the in-phase component only according to another embodiment of the present invention will be described later.

The first transmission symbol estimator 310 comprises a first symbol converter 312 and a transmission symbol determiner 314.

The first symbol converter 312 converts a pair of first received symbols $(X_n, Y_n)$ according to equation 1.

$$\begin{bmatrix} Y1 \\ Y2 \end{bmatrix} = \begin{bmatrix} -\sin\left(\frac{-\pi}{M} + y\right) & \cos\left(\frac{-\pi}{M} + y\right) \\ -\sin\left(\frac{\pi}{M} + y\right) & \cos\left(\frac{\pi}{M} + y\right) \end{bmatrix} \begin{bmatrix} X_n \\ Y_n \end{bmatrix}, \quad (1)$$

where y denotes the quadrature error. The transmission symbol determiner 314 determines a pair of the received symbols satisfying Y1>0 and Y2>0 as the pair of received symbols of the transmission symbol having the in-phase component only, i.e., an estimated pair of symbols, and provides the pair of received symbols to the conversion parameter determiner 316.

The conversion parameter determiner 316 determines an angle, i.e., $f=\tan^{-1}(\overline{Y}_{N1}/\overline{X}_{N1})$, between an in-phase symbol average value $\overline{X}_{N1}$ of the estimated pair of symbols $X_n, Y_n$ and a quadrature symbol average value $\overline{Y}_{N1}$ of the estimated pair of symbols $X_n, Y_n$ as the conversion parameter. $\overline{X}_{N1}$ and $\overline{Y}_{N1}$ are calculated by continuously updating average values $\overline{X}_n$ and $\overline{Y}_n$ until n=N1 using equations 2 and 3 below. $\overline{X}_{N1}$ and $\overline{Y}_{N1}$ denote the in-phase symbol average value and the quadrature symbol average value calculated using the N1 estimated pairs of symbols. Here, N1 is a natural number. The greater the value of N1, the more accurately the value of f can be estimated.

$$\overline{X}_n = \frac{n-1}{n}\overline{X}_{n-1} + \frac{X_n}{n}, \quad (2)$$

$$\overline{Y}_n = \frac{n-1}{n}\overline{Y}_{n-1} + \frac{Y_n}{n}, \quad (3)$$

The converter & determiner 320 converts a pair of second received symbols using the conversion parameter f, and determines the transmission symbol according to a symbol of the converted pair of second received symbols. The converter & determiner 320 comprises a symbol decision region converter 322 and a transmission symbol determiner 324.

The symbol decision region converter 322 converts the pair of second received symbols using equation 4, and provides the converted pair of second received symbols $(U_i, V_i)$ to the transmission symbol determiner 324.

$$\begin{bmatrix} U_i \\ V_i \end{bmatrix} = \begin{bmatrix} -\sin\left(\frac{\pi(2i-3)}{M} + \frac{f}{2}\right) & \cos\left(\frac{\pi(2i-3)}{M}\right) \\ -\sin\left(\frac{\pi(2i-1)}{M} + \frac{f}{2}\right) & \cos\left(\frac{\pi(2i-1)}{M}\right) \end{bmatrix} \begin{bmatrix} X_n \\ Y_n \end{bmatrix}, \quad (4)$$

where i denotes a transmission symbol index having a value from 1 through M. The transmission symbol determiner 324 determines the converted pair of second received symbols as $i^{th}$ transmission symbols if each of the converted pair of second received symbols satisfies $U_i>0, V_i<0$.

Figure 4:
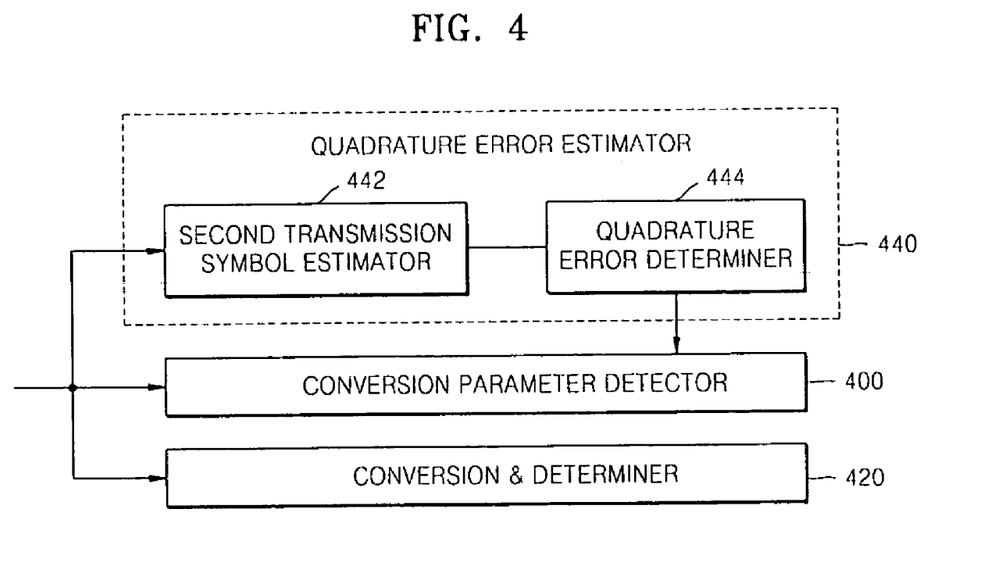
FIG. 4 is a block diagram of an apparatus for improving symbol error rate performance of an M-PSK system having a quadrature error according to another embodiment of the present invention.

FIG. 4 is a block diagram of an apparatus for improving symbol error rate performance of an M-PSK system having a quadrature error according to another embodiment of the present invention. Referring to FIG. 4, the apparatus for improving the symbol error rate performance of the M-PSK system having the quadrature error comprises a conversion parameter detector 400, a converter & determiner 420, and a quadrature error estimator 440.

The conversion parameter detector 400 and the converter & determiner 420 are the same as the conversion parameter detector 300 and the converter & determiner 320 illustrated in FIG. 3, and thus their descriptions will be omitted.

The quadrature error estimator 440 estimates the quadrature error using an average value of a pair of symbols estimated as predetermined transmission symbols among at least one pair of third received symbols, and provides the estimated quadrature error to the conversion parameter detector 400.

The quadrature error estimator 440 comprises a second transmission symbol estimator 442 and a quadrature error determiner 444.

The second transmission symbol estimator 442 estimates the pair of received symbols of the predetermined transmission symbol from the at least one pair of third received symbols. The predetermined transmission symbol can have an in-phase component only. In this case, the estimation method of using the training transmission symbol can be used or equation 5 below can be used. More specifically, the pair of third received symbols are converted using equation 5, if the converted pair of third received symbols Y3 and Y4 are positive and negative numbers, respectively, the pair of third received symbols are determined to be an estimated pair of symbols, and the determined pair $X_n, Y_n$ of third received symbols are provided to the quadrature error determiner 444.

$$\begin{bmatrix} Y3 \\ Y4 \end{bmatrix} = \begin{bmatrix} -\sin(-\pi/M) & \cos(-\pi/M) \\ -\sin(\pi/M) & \cos(\pi/M) \end{bmatrix} \begin{bmatrix} X_n \\ Y_n \end{bmatrix}, \quad (5)$$

The quadrature error determiner 444 determines an angle, i.e., $y=\tan^{-1}(\overline{Y}_{N2}/\overline{X}_{N2})$ between an in-phase symbol average value $\overline{X}_{N2}$ and a quadrature symbol average value $\overline{Y}_{N2}$ of the estimated pair of symbols $X_n, Y_n$ as the quadrature error. $\overline{X}_{N2}$ and $\overline{Y}_{N2}$ are calculated by continuously updating average values $\overline{X}_n$ and $\overline{Y}_n$ until n=N2 using equations 2 and 3 above. $\overline{X}_{N2}$ and $\overline{Y}_{N2}$ respectively denote the in-phase symbol average value and the quadrature symbol average value calculated using the N2 estimated pairs of symbols. Here, N2 is a natural number. The greater the value of N2, the more accurately the value of y can be estimated.

Figure 5A:
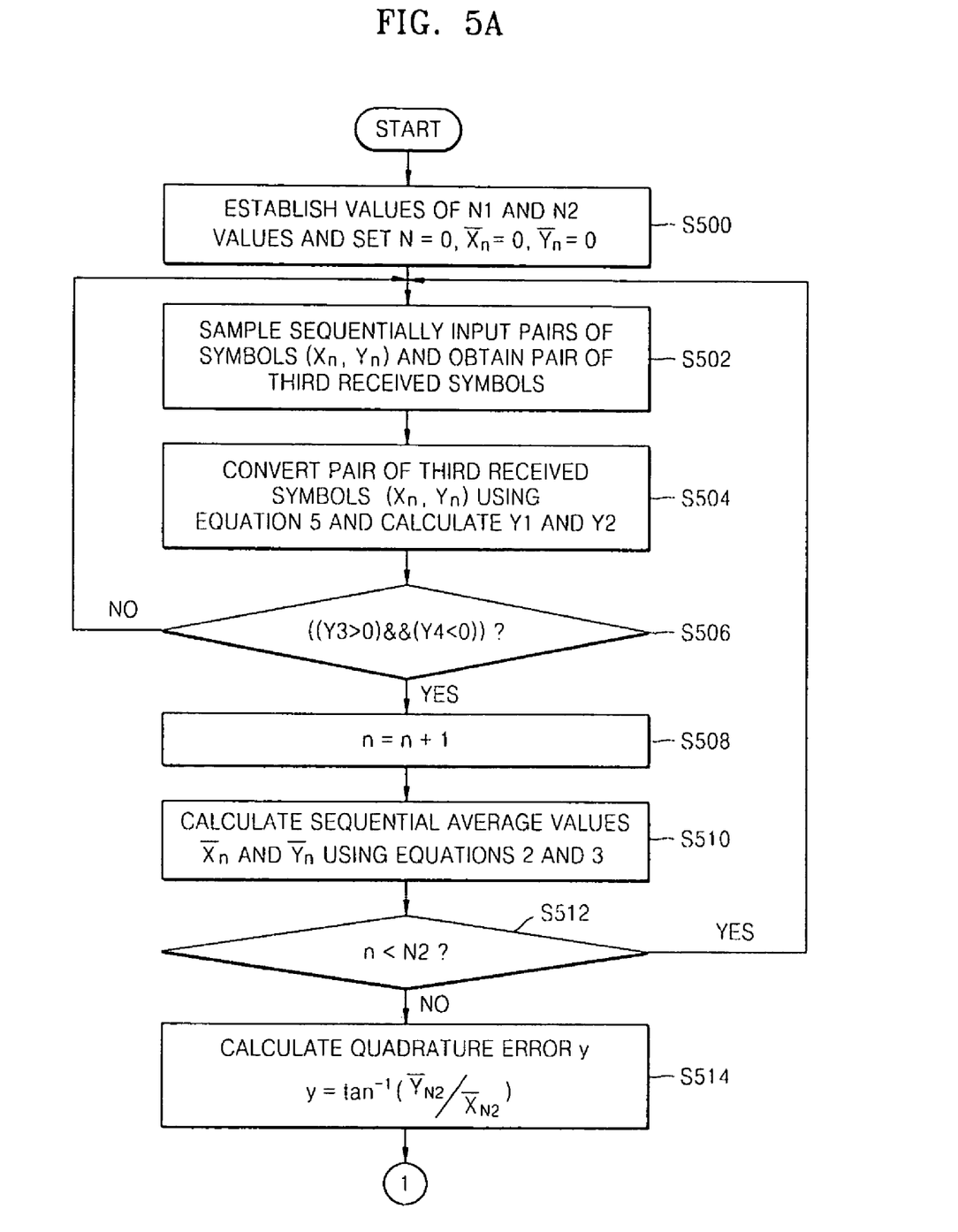
FIGS. 5A and 5B are flowcharts illustrating a method of improving symbol error rate performance of an M-PSK system having a quadrature error according to an embodiment of the present invention.
Figure 5B:
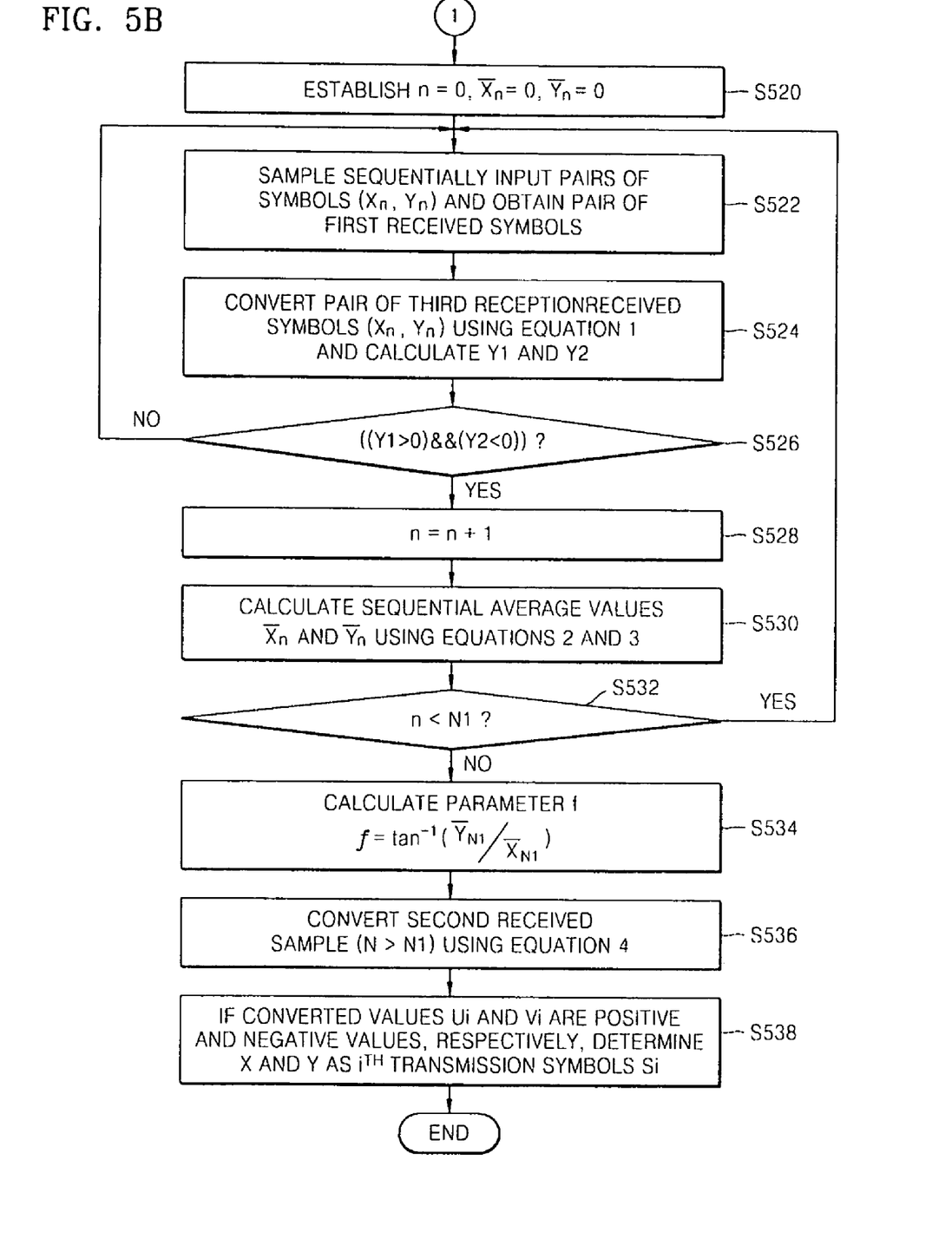

FIGS. 5A and 5B are flowcharts illustrating a method of improving symbol error rate performance of an M-PSK system having a quadrature error according to an embodiment of the present invention. Referring to FIGS. 5A and 5B, the method comprises operations 500 through 514 of estimating a quadrature error using the quadrature error estimator 440, operations 520 through 534 of detecting a conversion parameter using the conversion parameter detector 400, and operations 536 through 538 of converting and determining symbols using the converter & determiner 420.

The decision device 60 initializes the number of samples n and parameters $\overline{X}_n$ and $\overline{Y}_n$ to 0 to obtain an optimized symbol decision region, and establishes the numbers of sample N1 and N2 as predetermined natural numbers (Operation 500). Samples $(X_n, Y_n)$ constituting values input via I and Q channels to the decision device 60 are determined to be a pair of third received symbols for estimating the quadrature error (Operation 502).

The pair of third received symbols $(X_n, Y_n)$ is converted by the second transmission symbol estimator 442 using equation 5 to obtain Y3 and Y4 (Operation 504). The second transmission symbol estimator 442 determines whether Y3 and Y4 are positive or negative numbers, respectively (Operation 506). If Y3>0 and Y4<0, the second transmission symbol estimator 442 increases the value of n, and provides the pair of third received symbols $(X_n, Y_n)$ satisfying Y3>0 and Y4<0 to the quadrature error determiner 444 (Operation 508). If Y3>0 and Y4<0 are not satisfied, Operation 502 is performed and a next sample is obtained. After Operation 508 is performed, the pair of third received symbols $(X_n, Y_n)$ received by the second transmission symbol estimator 442 is used to update average values $\overline{X}_n$ and $\overline{Y}_n$ through equations 2 and 3 using the quadrature error determiner 444 (Operation 510). The quadrature error determiner 444 determines whether n<N2 (Operation 512). When the average value is calculated using N2 samples, the calculated quadrature error can be determined to be accurate.

If the quadrature error determiner 444 determines that n<N2, Operation 502 is performed, and a next sample is obtained. If the quadrature error determiner 444 determines that n is greater than or the same as N2, the quadrature error determiner 444 calculates the quadrature error $y=\tan^{-1}(\overline{Y}_{N2}/\overline{X}_{N2})$ (Operation 514).

A conversion parameter f is then calculated. To reuse the parameters $\overline{X}_n, \overline{X}_n$ the number of samples (n) and the parameters $\overline{X}_n$ and $\overline{X}_n$ are initialized to 0 (Operation 520). Samples $(X_n, Y_n)$ constituting values input via the I and Q channels to the decision device 60 are determined to be a pair of first received symbols for estimating the conversion parameter (Operation 522).

The pair of first received symbols $(X_n, Y_n)$ is converted by the first symbol converter 312 using equation 1 to calculate Y1 and Y2 (Operation 524). The transmission symbol determiner 314 determines whether Y1 and Y2 are positive or negative numbers, respectively (Operation 526). If Y1>0 and Y2<0, n is increased, and the pair of first received symbols $(X_n, Y_n)$ satisfying Y1>0 and Y2<0 are provided to the conversion parameter determiner 316 (Operation 528). If Y1>0 and Y2<0 are not satisfied, Operation 522 is performed.

After Operation 528 is performed, the conversion parameter determiner 316 updates the average values $\overline{X}_n$ and $\overline{Y}_n$ of equations 2 and 3 using the pair of first received symbols $(X_n, Y_n)$ satisfying Y1>0 and Y2<0 output by the transmission symbol determiner 314 (Operation 510). The conversion parameter determiner 316 determines whether n<N1 (Operation 532). When the average value is calculated using N1 samples, the calculated quadrature error can be determined to be accurate.

If the conversion parameter determiner 316 determines that n<N1, Operation 522 is performed, and a next sample is obtained. If the conversion parameter determiner 316 determines that n is greater than or the same as N1, the conversion parameter determiner 316 calculates the quadrature error $f=\tan^{-1}(\overline{Y}_{N1}/\overline{X}_{N1})$ (Operation 534).

Samples $(X_n, Y_n)$ constituting values input via the I and Q channels to the decision device 60 are determined as a pair of second received symbols for estimating the transmission symbol.

In Operation 534, the symbol decision region converter 322 converts the pair of second received symbols using the estimated parameter f and equation 4 (Operation 536).

The transmission symbol determiner 324 obtains a value i used to make the converted values Ui and Vi positive and negative values, respectively, and determines the obtained value i as a transmission symbol value as the pair of second received symbols (Operation 538).

Figure 6:
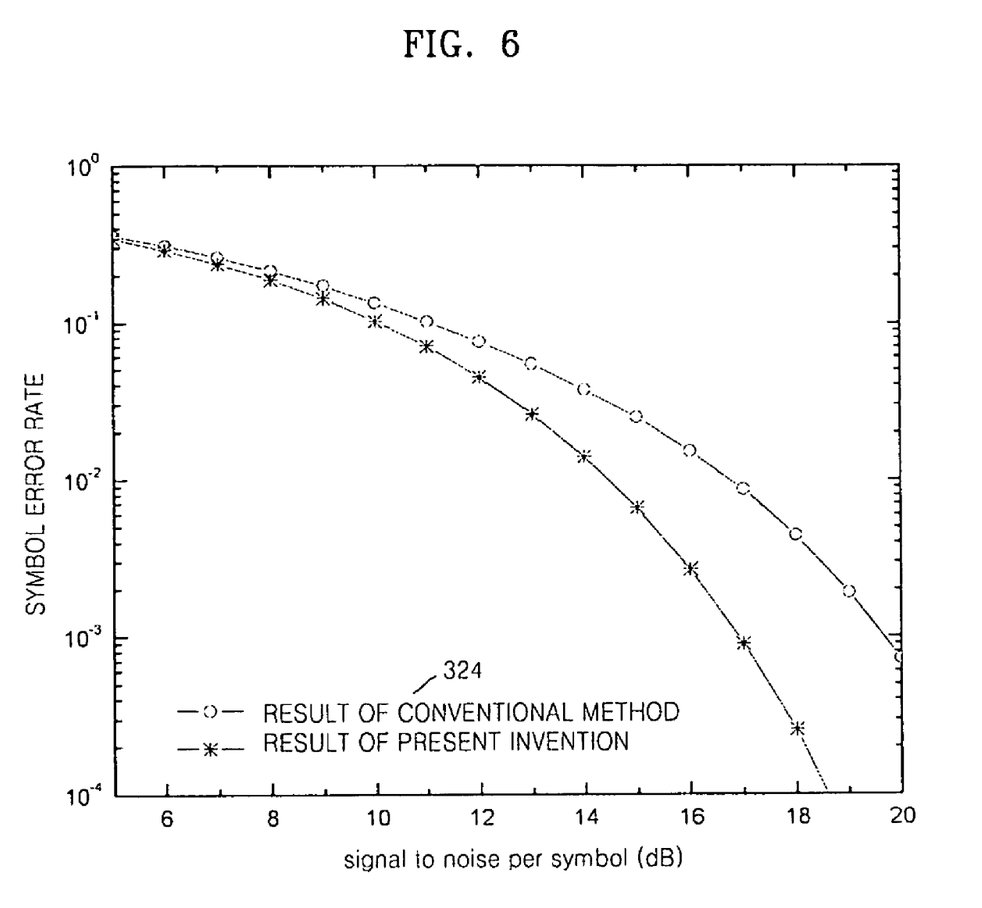
FIG. 6 is a graph illustrating symbol error rate performance curves of a general method and an 8-PSK system of a Gaussian channel according to an embodiment of the present invention.

FIG. 6 is a graph illustrating symbol error rate performance curves produced using a general method and an 8-PSK system of a Gaussian channel according to an embodiment of the present invention. The results shown in FIG. 6 were obtained using N1=N2=100000.

The vertical axis indicates a symbol error rate and the horizontal axis indicates a signal-to-noise ratio per symbol. When using the method according to an embodiment of the present invention, a region having a symbol error of $10^{-3}$ can be obtained at a signal-to-noise ratio per symbol that is 3 dB higher than when using the general method excluding a quadrature error.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves. The computer readable recording medium can also be distributed network coupled computer systems so that the computer readable code is stored and executed in a distributed fashion. Also, functional programs, code and code segments for accomplishing the present invention can be easily construed by programmer skilled in the art to which the present invention pertains.

According to the present invention, the symbol error rate of an M-PSK system having a quadrature error can be reduced. In detail, the M-PSK system having a quadrature error of $\pi/15$ in a Gaussian channel environment has a signal-to-noise ratio that is increased by 3 dB in a symbol error rate region of $10^{-3}$. The quadrature error can be estimated using a simple process of linear conversion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for improving a symbol error rate of an M-ary phase shift keying (M-PSK) system having a quadrature error, the apparatus comprising:
 a conversion parameter detector that detects a conversion parameter for converting a symbol decision region using the quadrature error and at least one pair of first received symbols; and
 a converter & determiner converting a pair of second received symbols using the detected conversion parameter, and determining a transmission symbol according to a symbol of the converted pair of second received symbols,
 wherein the conversion parameter detector comprises:
  a first transmission symbol estimator estimating the pair of received symbols of a transmission symbol having an in-phase component only among the at least one pair of first received symbols; and
  a conversion parameter determiner determining an angle between an in-phase symbol average value of the estimated pair of symbols and a quadrature symbol average value as the conversion parameter,
 wherein the first transmission symbol estimator comprises:
  a first symbol converter converting the pair of first received symbols $(X_n, Y_n)$ using equation, $$\begin{bmatrix} Y1 \\ Y2 \end{bmatrix} = \begin{bmatrix} -\sin\left(\frac{-\pi}{M}+y\right) & \cos\left(\frac{-\pi}{M}+y\right) \\ -\sin\left(\frac{\pi}{M}+y\right) & \cos\left(\frac{\pi}{M}+y\right) \end{bmatrix} \begin{bmatrix} X_n \\ Y_n \end{bmatrix},$$

wherein y denotes the quadrature error, and M denotes a modulation level of the PSK system; and
  a transmission symbol determiner determining the pair of received symbols that make Y1 and Y2 positive and negative values, respectively, as a pair of received symbols of the transmission symbol having an in-phase component only.

2. An apparatus for improving a symbol error rate of an M-ary phase shift keying (M-PSK) system having a quadrature error, the apparatus comprising:
 a conversion parameter detector that detects a conversion parameter for converting a symbol decision region using the quadrature error and at least one pair of first received symbols; and
 a converter & determiner converting a pair of second received symbols using the detected conversion parameter, and determining a transmission symbol according to a symbol of the converted pair of second received symbols,
 wherein the converter & determiner comprises:
  a symbol decision region converter converting the pair of second received symbols using equation $$\begin{bmatrix} U_i \\ V_i \end{bmatrix} = \begin{bmatrix} -\sin\left(\frac{\pi(2i-3)}{M}+\frac{f}{2}\right) & \cos\left(\frac{\pi(2i-3)}{M}\right) \\ -\sin\left(\frac{\pi(2i-1)}{M}+\frac{f}{2}\right) & \cos\left(\frac{\pi(2i-1)}{M}\right) \end{bmatrix} \begin{bmatrix} X_n \\ Y_n \end{bmatrix},$$

wherein i denotes a transmission symbol index having a value from 1 through M, M denotes a modulation level of the PSK system, and f denotes the conversion parameter; and
  a transmission symbol determiner determining the converted pair of second received symbols as $i^{th}$ transmission symbols if the converted pair of second received symbols (Ui, Vi) are positive and negative values, respectively.

3. An apparatus for improving a symbol error rate of an M-ary phase shift keying (M-PSK) system having a quadrature error, the apparatus comprising:
 a conversion parameter detector that detects a conversion parameter for converting a symbol decision region using the quadrature error and at least one pair of first received symbols;
 a converter & determiner converting a pair of second received symbols using the detected conversion parameter, and determining a transmission symbol according to a symbol of the converted pair of second received symbols; and
 a quadrature error estimator estimating the quadrature error using an average value of a pair of symbols estimated as predetermined transmission symbols among at least one pair of third received symbols,
 wherein the quadrature error estimator comprises:
  a second transmission symbol estimator estimating a pair of received symbols of a transmission symbol having an in-phase component only among the at least one pair of third received symbols; and a quadrature error determiner determining an angle between an in-phase symbol average value and a quadrature symbol average value as the quadrature error, and wherein the second transmission symbol estimator converts the pair of third received symbols using $$\begin{bmatrix} Y3 \\ Y4 \end{bmatrix} = \begin{bmatrix} -\sin(-\pi/M) & \cos(-\pi/M) \\ -\sin(\pi/M) & \cos(\pi/M) \end{bmatrix} \begin{bmatrix} X_n \\ Y_n \end{bmatrix},$$

wherein M denotes a modulation level of the PSK system, if the converted pair of third received symbols Y3 and Y4 are positive and negative numbers, respectively, and estimates the pair of third received symbols as the pair of received symbols of the transmission symbol having the in-phase component only.

4. A method of improving a symbol error rate of a M-PSK system having a quadrature error, the apparatus comprising:
  detecting a conversion parameter for converting a symbol decision region using the quadrature error and at least one pair of first received symbols;
  converting a pair of second received symbols using the detected conversion parameter; and
  determining a transmission symbol according to a symbol of the converted pair of second received symbols,
  wherein the detecting of the conversion parameter comprises:
    estimating the pair of received symbols of a transmission symbol having an in-phase component only among the at least one pair of first received symbols; and
    determining an angle between an in-phase symbol average value of the estimated pair of symbols and a quadrature symbol average value as the conversion parameter, and
  wherein estimating of the pair of received symbols comprises:
    converting the pair of first received symbols $(X_n, Y_n)$ using equation, $$\begin{bmatrix} Y3 \\ Y4 \end{bmatrix} = \begin{bmatrix} -\sin(-\pi/M) & \cos(-\pi/M) \\ -\sin(\pi/M) & \cos(\pi/M) \end{bmatrix} \begin{bmatrix} X_n \\ Y_n \end{bmatrix},$$

wherein y denotes the quadrature error, and M denotes a modulation level of the PSK system; and
    determining the pair of received symbols that make Y1 and Y2 positive and negative values, respectively, as a pair of received symbols of the transmission symbol having an in-phase component only.

5. A method of improving a symbol error rate of a M-PSK system having a quadrature error, the apparatus comprising:
  detecting a conversion parameter for converting a symbol decision region using the quadrature error and at least one pair of first received symbols;
  converting a pair of second received symbols using the detected conversion parameter; and
  determining a transmission symbol according to a symbol of the converted pair of second received symbols,
  wherein the converting of the pair of second received symbols comprises:
    converting the pair of second received symbols using equation $$\begin{bmatrix} U_i \\ V_i \end{bmatrix} = \begin{bmatrix} -\sin\left(\frac{\pi(2i-3)}{M} + \frac{f}{2}\right) & \cos\left(\frac{\pi(2i-3)}{M}\right) \\ -\sin\left(\frac{\pi(2i-1)}{M} + \frac{f}{2}\right) & \cos\left(\frac{\pi(2i-1)}{M}\right) \end{bmatrix} \begin{bmatrix} X_n \\ Y_n \end{bmatrix},$$

wherein i denotes a transmission symbol index having a value from 1 through M, M denotes a modulation level of the PSK system, and f denotes the conversion parameter; and
    determining the converted pair of second received symbols as $i^{th}$ transmission symbols if the converted pair of second received symbols (Ui, Vi) are positive and negative values, respectively.

6. A method of improving a symbol error rate of a M-PSK system having a quadrature error, the apparatus comprising:
  detecting a conversion parameter for converting a symbol decision region using the quadrature error and at least one pair of first received symbols;
  converting a pair of second received symbols using the detected conversion parameter;
  determining a transmission symbol according to a symbol of the converted pair of second received symbols; and
  estimating the quadrature error using an average value of a pair of symbols estimated as predetermined transmission symbols among at least one pair of third received symbol,
  wherein the estimating of the quadrature error comprises:
    estimating a pair of received symbols of a transmission symbol having an in-phase component among the at least one pair of third received symbols; and,
    determining an angle between an in-phase symbol average value and a quadrature symbol average value as the quadrature error,
  wherein the pair of third received symbols are converted using $$\begin{bmatrix} Y3 \\ Y4 \end{bmatrix} = \begin{bmatrix} -\sin(-\pi/M) & \cos(-\pi/M) \\ -\sin(\pi/M) & \cos(\pi/M) \end{bmatrix} \begin{bmatrix} X_n \\ Y_n \end{bmatrix},$$

wherein M denotes a modulation level of the PSK system, if the converted pair of third received symbols Y3 and Y4 are positive and negative numbers, respectively, and the pair of third received symbols is estimated as the pair of received symbols of the transmission symbol having the in-phase component only.

* * * * *